(12) United States Patent
Terwilliger et al.

(10) Patent No.: US 10,773,812 B2
(45) Date of Patent: Sep. 15, 2020

(54) HYBRID ELECTRIC AIRCRAFT BATTERY CHARGING

(71) Applicant: United Technologies Corporation, Farmington, CT (US)

(72) Inventors: Neil Terwilliger, Meriden, CT (US); David A. Golfin, Middletown, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 99 days.

(21) Appl. No.: 16/104,288

(22) Filed: Aug. 17, 2018

(65) Prior Publication Data

US 2020/0055610 A1  Feb. 20, 2020

(51) Int. Cl.
*B64D 27/02* (2006.01)
*B60L 53/24* (2019.01)
(Continued)

(52) U.S. Cl.
CPC .............. *B64D 27/02* (2013.01); *B60L 53/24* (2019.02); *B64D 27/10* (2013.01); *B64D 27/24* (2013.01);
(Continued)

(58) Field of Classification Search
CPC .. B64D 27/02; B64D 2027/026; B64D 27/10; B64D 27/24; B60L 53/24; B60L 2200/10; B60L 50/13; B60L 50/61; B60L 53/00; B60L 58/10; F01D 15/10; F02C 6/14; H02J 7/14; H02J 7/007; H02J 7/1415; H02J 7/1446; F05D 2220/323; F05D 2220/76; F05D 2270/335
See application file for complete search history.

(56) References Cited

U.S. PATENT DOCUMENTS 7,952,244 B2 * 5/2011 Colin ................... F01D 15/10
290/52
8,291,716 B2 * 10/2012 Foster ................... F02C 6/14
60/788

(Continued)

FOREIGN PATENT DOCUMENTS

EP         2985901 A1    2/2016
WO    2014158240 A2   10/2014

OTHER PUBLICATIONS

EP Application No. 19191993.5 Extended EP Search Report dated Feb. 19, 2020, 6 pages.

*Primary Examiner* — Babar Sarwar
(74) *Attorney, Agent, or Firm* — Cantor Colburn LLP (57) ABSTRACT

An aspect includes a battery charging system for a hybrid electric aircraft. The battery charging system includes a generator, a battery system, and a controller. The controller is operable to charge the battery system up to a first charge level based on receiving a first charging current at a power input. An operational status of a gas turbine engine of the hybrid electric aircraft is monitored. The battery system is charged at a second charging current received from the generator driven by the gas turbine engine responsive to determining that the gas turbine engine is in a taxi state, where the second charging current is less than the first charging current. Charging of the battery system is halted based on detecting a transition of the gas turbine engine from the taxi state to an off-idle throttle state.

20 Claims, 5 Drawing Sheets

(51) Int. Cl.
    *B64D 27/10*    (2006.01)
    *B64D 27/24*    (2006.01)
    *F01D 15/10*    (2006.01)
    *F02C 6/14*     (2006.01)
    *H02J 7/14*     (2006.01)

(52) U.S. Cl.
    CPC ............... *F01D 15/10* (2013.01); *F02C 6/14* (2013.01); *H02J 7/14* (2013.01); *B60L 2200/10* (2013.01); *B64D 2027/026* (2013.01); *F05D 2220/323* (2013.01); *F05D 2220/76* (2013.01); *F05D 2270/335* (2013.01)

(56) References Cited

U.S. PATENT DOCUMENTS

| | | | |
|---|---|---|---|
| 9,586,690 B2 * | 3/2017 | Rajashekara | B64C 11/305 |
| 9,650,130 B2 * | 5/2017 | Bouzmane | B64C 25/405 |
| 2009/0145998 A1 * | 6/2009 | Salyer | B64C 27/04 |
| | | | 244/17.23 |
| 2010/0126178 A1 * | 5/2010 | Hyde | F01K 23/10 |
| | | | 60/767 |
| 2010/0219779 A1 * | 9/2010 | Bradbrook | F02C 7/32 |
| | | | 318/153 |
| 2015/0151844 A1 * | 6/2015 | Anton | B64D 27/24 |
| | | | 244/55 |
| 2016/0023773 A1 * | 1/2016 | Himmelmann | H02M 5/458 |
| | | | 60/778 |
| 2016/0070266 A1 * | 3/2016 | DiVito | B60L 7/16 |
| | | | 307/9.1 |
| 2017/0166077 A1 * | 6/2017 | Hwang | B60L 58/20 |
| 2017/0190441 A1 * | 7/2017 | Mackin | F02C 7/36 |
| 2017/0217573 A1 * | 8/2017 | Bouzmane | B60L 53/12 |
| 2018/0134413 A1 * | 5/2018 | Halsey | B64F 1/225 |
| 2018/0178920 A1 * | 6/2018 | Swann | F02C 9/48 |
| 2019/0375512 A1 * | 12/2019 | Ribeiro | F02C 6/20 |

* cited by examiner

HYBRID ELECTRIC AIRCRAFT BATTERY CHARGING

BACKGROUND

The subject matter disclosed herein generally relates to battery charging systems and, more particularly, to a method and apparatus for hybrid electric aircraft battery charging.

Hybrid electric aircraft use electricity to provide a portion of the power needed for propulsion by converting electricity into a propulsive force. Battery storage capacity on an aircraft can be limited due to weight and size restrictions. The process of recharging batteries used by a hybrid electric aircraft can be time consuming, particularly for high-energy density batteries.

BRIEF DESCRIPTION

According to one embodiment, a battery charging system for a hybrid electric aircraft is provided. The battery charging system includes a generator, a battery system, and a controller. The controller is operable to charge the battery system up to a first charge level based on receiving a first charging current at a power input. An operational status of a gas turbine engine of the hybrid electric aircraft is monitored. The battery system is charged at a second charging current received from the generator driven by the gas turbine engine responsive to determining that the gas turbine engine is in a taxi state, where the second charging current is less than the first charging current. Charging of the battery system is halted based on detecting a transition of the gas turbine engine from the taxi state to an off-idle throttle state.

In addition to one or more of the features described above or below, or as an alternative, further embodiments may include where the first charging current is received from a ground-based power source through the power input.

In addition to one or more of the features described above or below, or as an alternative, further embodiments may include where the generator is operably coupled to a spool of the gas turbine engine.

In addition to one or more of the features described above or below, or as an alternative, further embodiments may include where the gas turbine engine is operated with a higher engine power setting above idle to increase charging rate and reduce idle thrust via power extraction in the taxi state.

In addition to one or more of the features described above or below, or as an alternative, further embodiments may include where the generator is a motor-generator operable in a generator mode to charge the battery system and in a motor mode to provide supplemental rotation force to the gas turbine engine.

In addition to one or more of the features described above or below, or as an alternative, further embodiments may include where the battery system is used during flight to power one or more electrical systems of the hybrid electric aircraft.

In addition to one or more of the features described above or below, or as an alternative, further embodiments may include where the controller is configured to continue to charge the battery system beyond the first charge level based on detecting that the second charging current is available at the power input after reaching the first charge level.

According to another embodiment, a propulsion system includes a gas turbine engine, a generator operably coupled to the gas turbine engine, a battery system, and a controller. The controller is operable to charge the battery system up to a first charge level based on receiving a first charging current at a power input, monitor an operational status of the gas turbine engine, and charge the battery system at a second charging current received from the generator responsive to determining that the gas turbine engine is in a taxi state, where the second charging current is less than the first charging current. Charging of the battery system can be halted based on detecting a transition of the gas turbine engine from the taxi state to an off-idle throttle state or upon reaching a full charge level of the battery system.

According to another embodiment, a method of charging a battery system of a hybrid electric aircraft includes charging the battery system up to a first charge level based on receiving a first charging current at a power input and monitoring an operational status of a gas turbine engine of the hybrid electric aircraft. The battery system is charged at a second charging current received from the generator driven by the gas turbine engine responsive to determining that the gas turbine engine is in a taxi state, where the second charging current is less than the first charging current. Charging of the battery system can be halted based on detecting a transition of the gas turbine engine from the taxi state to an off-idle throttle state.

A technical effect of the apparatus, systems and methods is achieved by providing a recharging sequence to selectively recharge batteries of a hybrid electric aircraft during ground-based operations as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
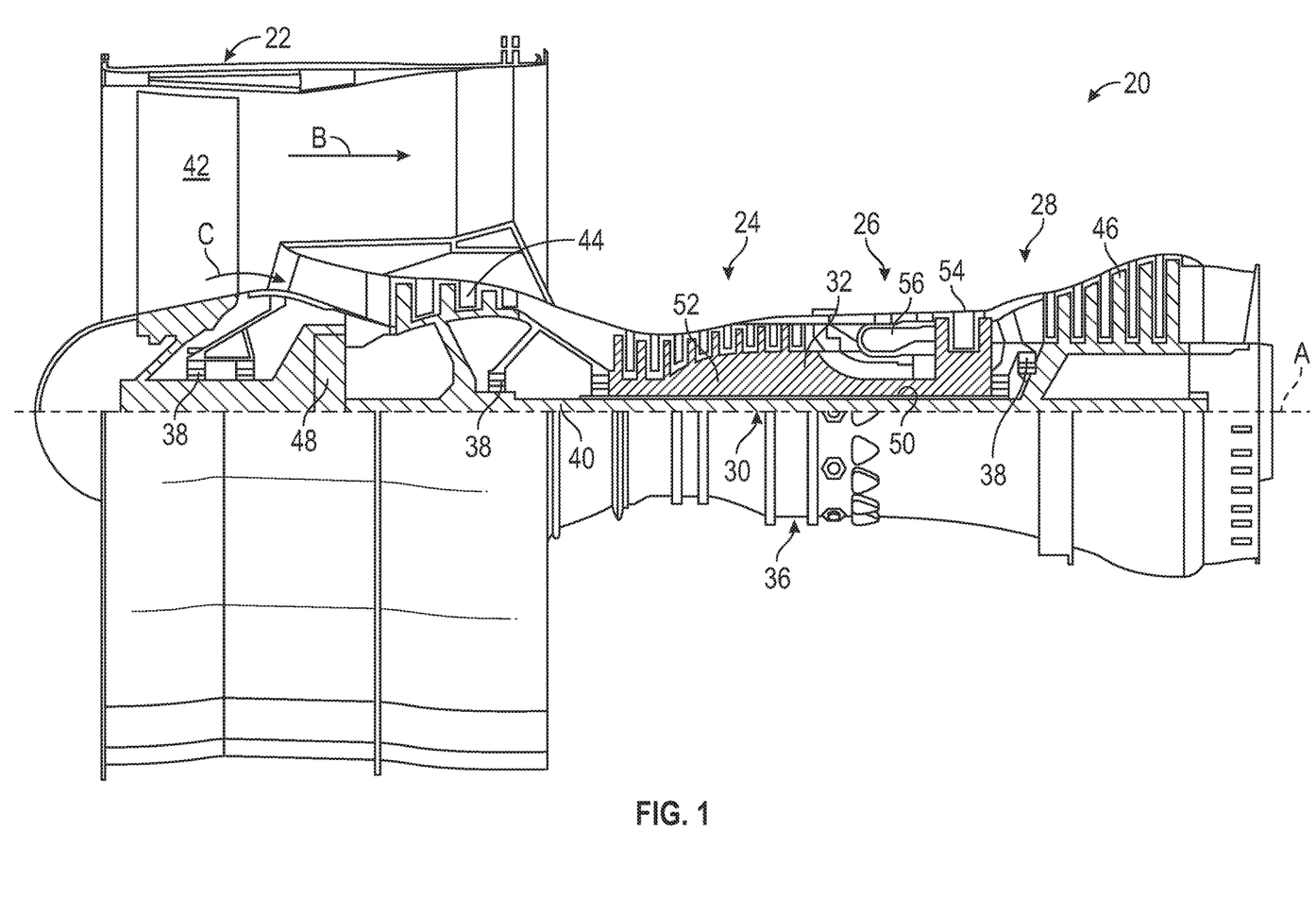
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
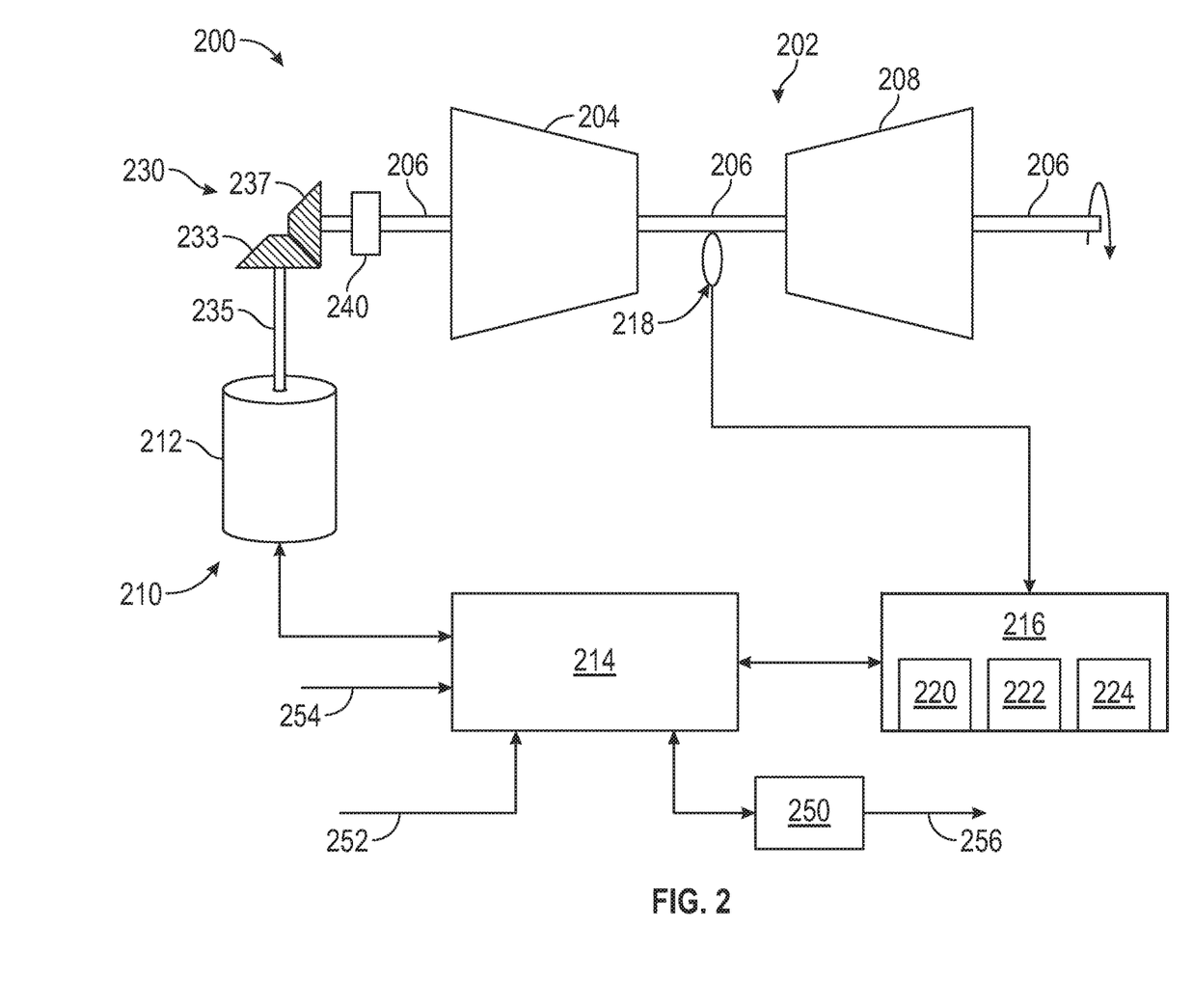
FIG. 2 is a schematic diagram of a battery charging system for a hybrid electric aircraft, in accordance with an embodiment of the disclosure.

FIG. 2 illustrates a rotor system 202 that includes at least one compressor section 204 and at least one turbine section 208 operably coupled to a shaft 206 as part of a hybrid electric aircraft 200. The rotor system 202 can be a spool of the gas turbine engine 20 of FIG. 1, such as the low speed spool 30 or the high speed spool 32. For example, when embodied as the low speed spool 30, the at least one compressor section 204 can be equivalent to the low pressure compressor 44, the shaft 206 can be equivalent to the inner shaft 40, and the at least one turbine section 208 can be equivalent to the low pressure turbine 46 of FIG. 1. When embodied as the high speed spool 32, the at least one compressor section 204 can be equivalent to the high pressure compressor 52, the shaft 206 can be equivalent to the outer shaft 50, and the at least one turbine section 208 can be equivalent to the high pressure turbine 54 of FIG. 1.

In the example of FIG. 2, a battery charging system 210 is operably coupled to the rotor system 202. The battery charging system 210 includes a generator 212 operably coupled to the shaft 206. In the example of FIG. 2, a geared interface 230 operably couples the generator 212 to the shaft 206. The geared interface 230 can include, for instance, an auxiliary gear 233 coupled to an auxiliary shaft 235 driven by the generator 212. The geared interface 230 can also include a rotor gear 237 coupled to the shaft 206. The auxiliary gear 233 and the rotor gear 237 can each be beveled gears. The auxiliary shaft 235 can be a tower shaft that enables the generator 212 to be separated at a greater distance from the rotor system 202 than direct coupling to the shaft 206 would provide. Further separation of the generator 212 from the rotor system 202 can improve accessibility to the generator 212 for servicing and may reduce heating effects of the rotor system 202 on the generator 212 (e.g., due to fuel combustion). A disconnect 240, such as a clutch, can be positioned between the generator 212 and a portion of the shaft 206 such that the generator 212 can be selectively engaged and disengaged to rotate with rotation of the shaft 206. In alternate embodiments, the generator 212 is operably coupled to the shaft 206 absent the geared interface 230 (e.g., direct coupling).

The battery charging system 210 also includes converter electronics 214 operable to condition current from the generator 212. In some embodiments, the generator 212 is a motor-generator configurable in a generator mode to charge a battery system 250 and in a motor mode to provide supplemental rotation force to the rotor system 202 of gas turbine engine 20 of FIG. 1. The generator 212 can include conventional generator/motor components, such as a rotor and stator, including a plurality of windings and/or permanent magnets. The converter electronics 214 can also include conventional current control electronics, such as filters, switching components, rectifiers, inverters, voltage converters, and the like. The generator 212 can perform as a variable frequency generator in a generator mode due to speed fluctuations of rotation of the shaft 206, which may be primarily driven by the at least one turbine section 208. Alternatively, a frequency normalizing component can interface with the generator 212 to produce a constant frequency output (e.g., through the converter electronics 214 or as a mechanical interface between the generator 212 and the shaft 206). In some embodiments, the generator 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the hybrid electric aircraft 200. Other uses and functions for the generator 212 are contemplated.

The converter electronics 214 can control charging of the battery system 250 responsive to a controller 216. The controller 216 can enable a flow of a charging current from the generator 212 or a power input 252 to charge the battery system 250 as regulated and conditioned through the converter electronics 214. The power input 252 can be an external input, such as power received through a plug interface while the hybrid electric aircraft 200 is on the ground at a ground-based power source, e.g., at a gate or service location. In some embodiments, the converter electronics 214 may receive electric current from an auxiliary power input 254 to provide a supplemental or alternative power source for charging the battery system 250. For instance, the auxiliary power input 254 may receive electric current from an auxiliary power unit (not depicted) or another instance of the gas turbine engine 20 on the hybrid electric aircraft 200. The charge stored in the battery system 250 can provide an electric current for a propulsion system use 256, which may include powering one or more electric motors of the hybrid electric aircraft 200 during various operational states and/or providing power to the generator 212 when operating in a motor mode, for instance, to assist in driving rotation of shaft 206. The propulsion system use 256 can be part of the gas turbine engine 20 that includes the rotor system 202 or another aircraft system, such as another instance of the gas turbine engine 20 on the hybrid electric aircraft 200.

In embodiments, the controller 216 of the battery charging system 210 can monitor one or more rotor system sensors 218 while the rotor system 202 is rotating. The rotor system sensors 218 can be any type or combination of sensors operable to measure aspects of the motion of the rotor system 202. For example, the rotor system sensors 218 can include one or more accelerometers, speed sensors, torque sensors, and the like. The rotor system sensors 218 can be existing sensors used for controlling the gas turbine engine 20. The controller 216 can control a charging of the battery system 250, for instance, by selecting the source of electric current received through the converter electronics 214. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216. In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the converter electronics 214 and/or other systems (not depicted).

Figure 4:
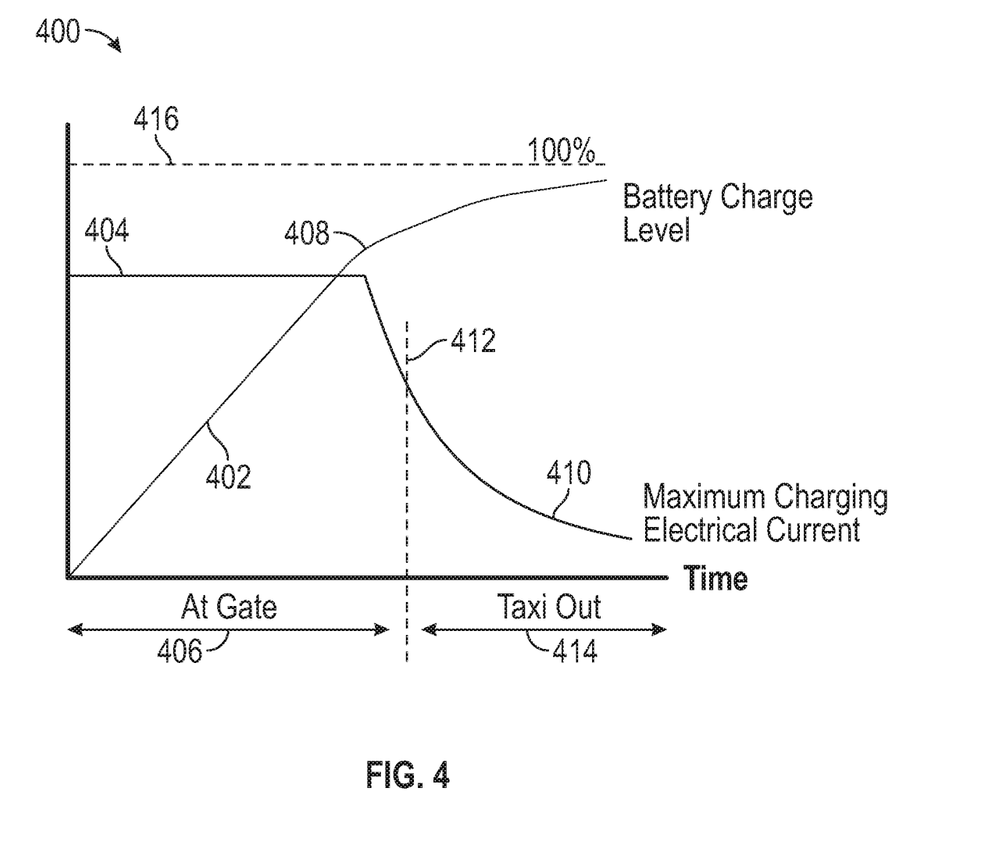
FIG. 4 is a battery charging plot of electrical current versus time, in accordance with an embodiment of the disclosure.

The controller 216 is operable to determine when to charge the battery system 250 through the power input 252 and when to charge the battery system 250 through the generator 212. Switching between charging sources while on the ground can enable the hybrid electric aircraft 200 to depart from a gate before the battery system 250 is fully charged. Upon reaching a partially charged state (e.g., a first charge level) at the gate, the generator 212 can be used to continue/complete charging while the hybrid electric aircraft 200 is in a taxi state, where the gas turbine engine 20 is operating at idle. This is referred to as "topping off" the charge of the battery system 250 and is graphically depicted in the example plot 400 of FIG. 4, where a battery charge level 402 increases more rapidly at a first charging current 404 during gate charging 406 from the power input 252 and slows upon reaching a first charge level 408. In the example of FIG. 4, the first charge level 408 is an inflection point where the charging rate of the battery system 250 substantially decreases, which may occur at about eighty percent of a full charge level 416 (e.g., where a full charge level is considered as about 100%). A second charging current 410 indicates a maximum or desired charging current to continue charging after crossing the first charge level 408 can decay non-linearly below the first charging current 404. A charging source transition 412 from the gate charging 406 to taxi charging 414 can occur after the first charge level 408 such that a lower level of current can be provided by the generator 212 as the second charging current 410 during taxi charging 414. The battery charge level 402 can continue to increase towards the full charge level 416 as the hybrid electric aircraft 200 remains in a taxi state performing taxi charging 414 until the battery charge level 402 reaches the full charge level 416 or the hybrid electric aircraft 200 transitions to an off-idle throttle state. During the off-idle throttle state, charging can be halted to reduce loading on the gas turbine engine 20. The off-idle throttle state refers to throttle movement that moves off a demand to operate the gas turbine engine 20 at idle. A threshold for confirming that the off-idle throttle state has been reached can be established for any desired power setting level above idle through takeoff power, for example. In some embodiments, the generator 212 can transition to a motor mode during takeoff or when throttle is otherwise moved off-idle to provide supplemental rotational force to the shaft 206. Further, supplemental or replacement current can be provided for battery charging through the auxiliary power input 254. Alternate transition points and operational states to support charging of the battery system 250 are contemplated.

Figure 3:
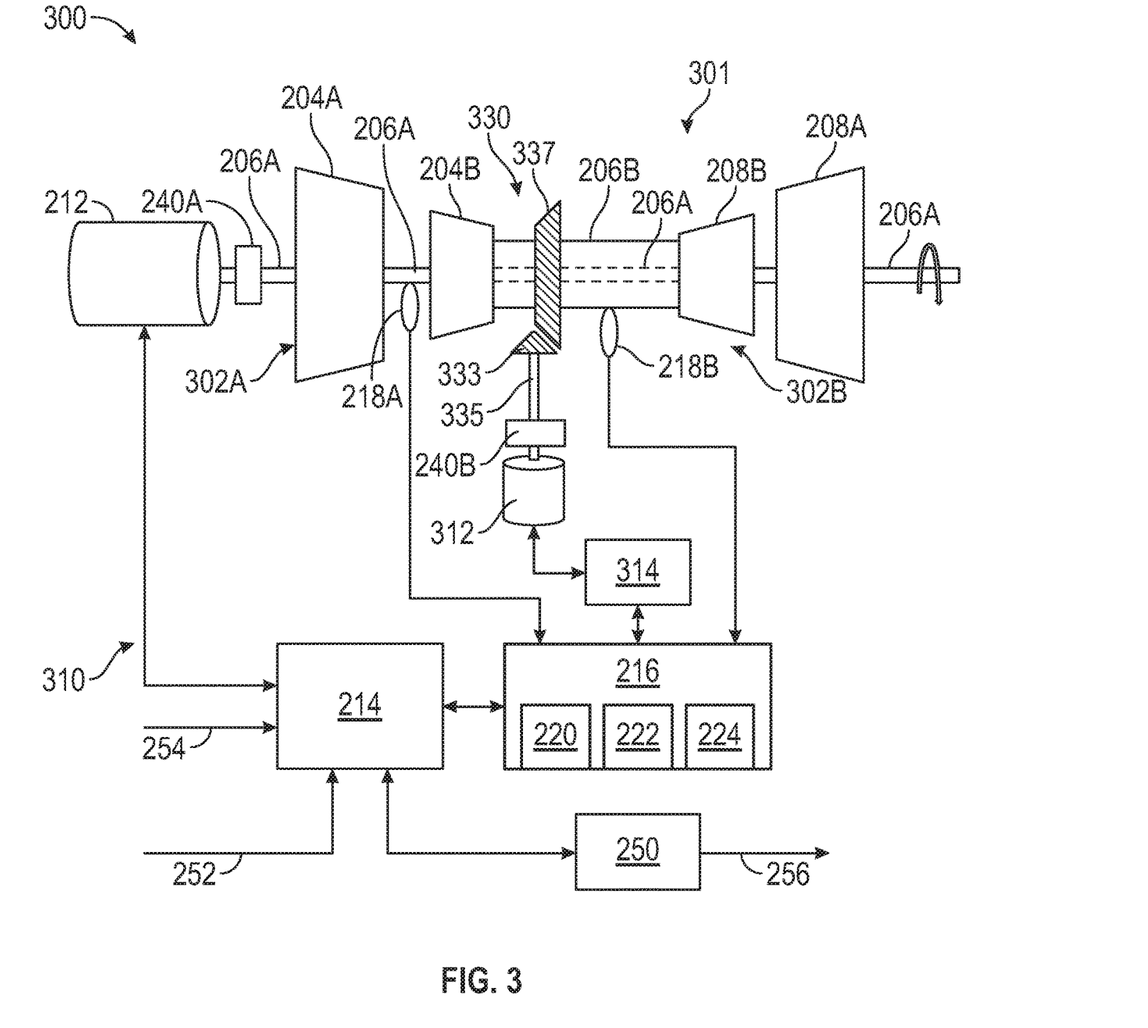
FIG. 3 is a schematic diagram of a battery charging system for a hybrid electric aircraft, in accordance with an embodiment of the disclosure.

FIG. 3 is a schematic diagram of a dual rotor system 301 as part of a hybrid electric aircraft 300 according to an embodiment. The dual rotor system 301 includes a first rotor system 302A and a second rotor system 302B, which may be an embodiment of the gas turbine engine 20 of FIG. 1. For instance, the first rotor system 302A can be the low speed spool 30 of the gas turbine engine 20, and the second rotor system 302B can be the high speed spool 32 of the gas turbine engine 20. The first rotor system 302A can include a first compressor section 204A and a first turbine section 208A operably coupled to a first shaft 206A. The second rotor system 302B can include a second compressor section 204B and a second turbine section 208B operably coupled to a second shaft 206B, where the second shaft 206B is concentrically arranged with respect to the first shaft 206A. With respect to the gas turbine engine 20 of FIG. 1, the first compressor section 204A can be equivalent to the low pressure compressor 44, the first shaft 206A can be equivalent to the inner shaft 40, and the first turbine section 208A can be equivalent to the low pressure turbine 46 of FIG. 1. Similarly, the second compressor section 204B can be equivalent to the high pressure compressor 52, the second shaft 206B can be equivalent to the outer shaft 50, and the second turbine section 208B can be equivalent to the high pressure turbine 54 of FIG. 1.

In the example of FIG. 3, a battery charging system 310 includes a generator 212 operably coupled to converter electronics 214 and an electric motor 312 driven by drive electronics 314. A first set of one or more rotor system sensors 218A may be associated with the first rotor system 302A, and a second set of one or more rotor system sensors 218B may be associated with the second rotor system 302B. The converter electronics 214 can control charging of the battery system 250 responsive to a controller 216 that may receive sensor data from the first set of one or more rotor system sensors 218A and the second set of one or more rotor system sensors 218B. The controller 216 may control the electric motor 312 through the drive electronics 314 responsive to sensor data from the first set of one or more rotor system sensors 218A and/or the second set of one or more rotor system sensors 218B. In other embodiments, the controller 216 is further subdivided as two or more separate controls, for instance, where a separate instance of the controller 216 is provided for each of the generator 212 and the electric motor 312. The generator 212 (when operated in a motor mode) and the electric motor 312 can be independently controlled to each supply a supplemental motive force to the respective shafts 206A, 206B, where fuel combustion in the combustor section 26 (FIG. 1) can provide a primary motive force for the first rotor system 302A as the low speed spool 30 and for the second rotor system 302B as the high speed spool 32. In some embodiments, the generator 212 and the electric motor 312 can each be configured in either a generator mode or a motor mode.

The generator 212 can be operably coupled to the first shaft 206A using a direct coupling, while the electric motor 312 can be operably coupled to the second shaft 206B using a geared interface 330. A first disconnect 240A, such as a clutch, can be positioned between the generator 212 and a portion of the first shaft 206A, and a second disconnect 240B can be positioned between the electric motor 312 and a portion of the second shaft 206B. The geared interface 330 can include, for instance, a motor gear 333 coupled to a motor shaft 335 driven by the electric motor 312 and a rotor gear 337 coupled to the second shaft 206B. While the example of FIG. 3 depicts the battery charging system 310 with the generator 212 and electric motor 312 in different coupling configurations, it will be understood that both of the generator 212 and electric motor 312 can be directly or indirectly coupled to corresponding first and second shafts 206A, 206B. For instance, the generator 212 may be indirectly coupled through a tower shaft to the first shaft 206A, while the electric motor 312 is directly coupled to the second shaft 206B. Further, the coupling locations of the generator 212 and electric motor 312 to the first and second shafts 206A, 206B can vary, and the coupling locations depicted in FIG. 3 are merely one example.

In the example of FIG. 3, the propulsion system use 256 can be to provide electrical power to the electric motor 312 and/or provide electrical power to the generator 212 when operating in a motor mode. In embodiments, the controller 216 may disable or provide limited current to the electric motor 312 while the battery system 250 is being charged by one or more of the generator 212, the power input 252, and/or the auxiliary power input 254. Electric current produced by the generator 212 above a level needed to charge the battery system 250 may be provided to other on-board uses.

Figure 5:
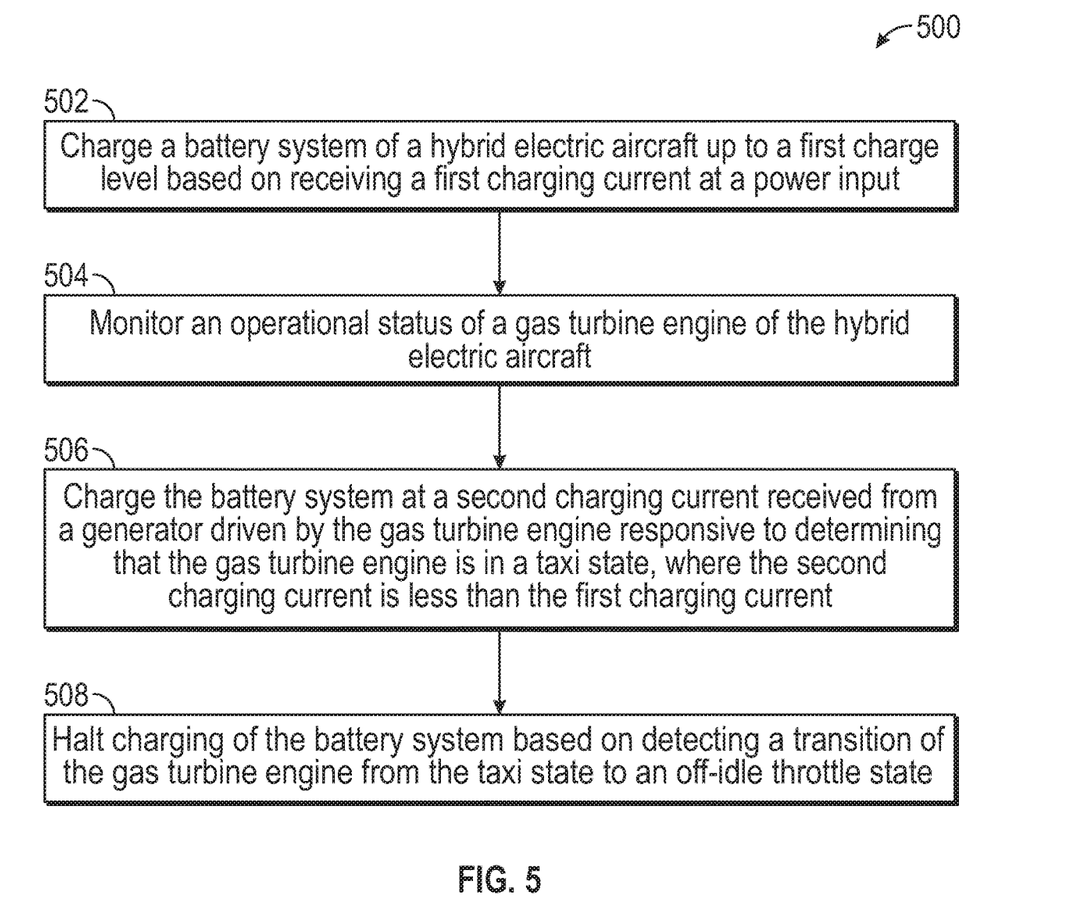
FIG. 5 is a flow chart illustrating a method, in accordance with an embodiment of the disclosure.

Referring now to FIG. 5 with continued reference to FIGS. 1-4, FIG. 5 is a flow chart illustrating a method 500 for hybrid electric aircraft battery charging, in accordance with an embodiment. The method 500 may be performed, for example, by the battery charging systems 210, 310 of FIGS. 2 and 3. For purposes of explanation, the method 500 is described primarily with respect to the battery charging system 210 of FIG. 2; however, it will be understood that the method 500 can be performed on other configurations, such as the battery charging system 310 of FIG. 3 as well as other configurations (not depicted).

At block 502, the controller 216 can charge the battery system 250 up to a first charge level 408 based on receiving a first charging current 404 at a power input 252. At block 504, the controller 216 can monitor an operational status of the gas turbine engine 20, for instance, based on sensor data from rotor system sensors 218. At block 506, the controller 216 can charge the battery system 250 at a second charging current 410 received from the generator 212 responsive to determining that the gas turbine engine 20 is in a taxi state, where the second charging current 410 is less than the first charging current 404. The controller 216 can be configured to continue to charging the battery system 250 beyond the first charge level 408 based on detecting that the second charging current 410 is available at the power input 252 after reaching the first charge level 408. At block 508, the controller 216 can halt charging of the battery system 250 based on detecting a transition of the gas turbine engine 20 from the taxi state to an off-idle throttle state or upon reaching a full charge level of the battery system 250. Engine spool rotational speed, throttle commands, and other inputs received at the controller 216 can be used to determine the operational status of the gas turbine engine 20. The battery system 250 can be used during flight to power one or more electrical systems of the hybrid electric aircraft 200, such as the propulsion system use 256 and/or other uses.

In embodiments, the gas turbine engine 20 can be operated with a higher engine power setting above idle to increase charging rate and reduce idle thrust via power extraction in the taxi state through power transfer to the generator 212. This can result in a lower exhaust gas temperature due to improved component efficiency at idle as a result of operation of the component in a higher speed range. Thrust at idle can be kept low at the higher engine power setting by performing power extraction from the low speed spool 30. Alternatively, power extraction can be performed from the high speed spool 32. The reduced second charging current 410 below the first charging current 404 can enable the use of a smaller size of the generator 212 than would otherwise be needed to reach the first charging current 404.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A battery charging system for a hybrid electric aircraft, the battery charging system comprising:
   a generator;
   a battery system; and
   a controller operable to:
      charge the battery system up to a first charge level based on receiving a first charging current at a power input during gate charging before departing a gate;
      monitor an operational status of a gas turbine engine of the hybrid electric aircraft; and
      charge the battery system at a second charging current received from the generator driven by the gas turbine engine in a taxi state after departing the gate during taxi charging, wherein the second charging current is less than the first charging current.

2. The battery charging system of claim 1, wherein the first charging current is received from a ground-based power source through the power input.

3. The battery charging system of claim 1, wherein the generator is operably coupled to a spool of the gas turbine engine, and the gas turbine engine is a thrust producing engine.

4. The battery charging system of claim 1, wherein the gas turbine engine is operated with a higher engine power setting above idle to increase charging rate and reduce idle thrust via power extraction in the taxi state.

5. The battery charging system of claim 1, wherein the generator is a motor-generator operable in a generator mode to charge the battery system and in a motor mode to provide supplemental rotation force to the gas turbine engine.

6. The battery charging system of claim 1, wherein the battery system is used during flight to power one or more electrical systems of the hybrid electric aircraft.

7. The battery charging system of claim 1, wherein the controller is configured to continue to charge the battery system beyond the first charge level based on detecting that the second charging current is available at the power input after reaching the first charge level.

8. A propulsion system comprising:
   a gas turbine engine;
   a generator operably coupled to the gas turbine engine;
   a battery system; and
   a controller operable to:
      charge the battery system up to a first charge level based on receiving a first charging current at a power input during gate charging before departing a gate;
      monitor an operational status of the gas turbine engine; and
      charge the battery system at a second charging current received from the generator in a taxi state after departing the gate during taxi charging, wherein the second charging current is less than the first charging current.

9. The propulsion system of claim 8, wherein the first charging current is received from a ground-based power source through the power input.

10. The propulsion system of claim 8, wherein the generator is operably coupled to a spool of the gas turbine engine, and the gas turbine engine is a thrust producing engine.

11. The propulsion system of claim 8, wherein the gas turbine engine is operated with a higher engine power setting above idle to increase charging rate and reduce idle thrust via power extraction in the taxi state.

12. The propulsion system of claim 8, wherein the generator is a motor-generator operable in a generator mode to charge the battery system and in a motor mode to provide supplemental rotation force to the gas turbine engine based on electric current from the battery system.

13. The propulsion system of claim 8, wherein the battery system is used during flight to power one or more electrical systems.

14. The propulsion system of claim 8, wherein the controller is configured to continue to charge the battery system beyond the first charge level based on detecting that the second charging current is available at the power input after reaching the first charge level.

15. A method of charging a battery system of a hybrid electric aircraft, the method comprising:
   charging the battery system up to a first charge level based on receiving a first charging current at a power input during gate charging before departing a gate;

monitoring an operational status of a gas turbine engine of the hybrid electric aircraft; and charging the battery system at a second charging current received from the generator driven by the gas turbine engine in a taxi state after departing the gate during taxi charging, wherein the second charging current is less than the first charging current.

16. The method of claim 15, wherein the first charging current is received from a ground-based power source through the power input.

17. The method of claim 15, further comprising:

operating the gas turbine engine with a higher engine power setting above idle to increase charging rate and reduce idle thrust via power extraction in the taxi state, and wherein the gas turbine engine is a thrust producing engine.

18. The method of claim 15, wherein the generator is a motor-generator operable in a generator mode to charge the battery system and in a motor mode to provide supplemental rotation force to the gas turbine engine.

19. The method of claim 15, wherein the battery system is used during flight to power one or more electrical systems of the hybrid electric aircraft.

20. The method of claim 15, further comprising:

continuing to charge the battery system beyond the first charge level based on detecting that a second charging current is available at the power input after reaching the first charge level.

* * * * *